(12) United States Patent
Kuriyagawa et al.

(10) Patent No.: US 10,070,584 B2
(45) Date of Patent: Sep. 11, 2018

(54) LAWN MOWER

(71) Applicant: HONDA MOTOR CO., LTD., Tokyo (JP)

(72) Inventors: Koji Kuriyagawa, Wako (JP); Hajime Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 15/443,144

(22) Filed: Feb. 27, 2017

(65) Prior Publication Data

US 2017/0245431 A1    Aug. 31, 2017

(30) Foreign Application Priority Data

Feb. 29, 2016    (JP) .................................. 2016-037306

(51) Int. Cl.
| | | |
|---|---|---|
| *A01D 34/73* | (2006.01) | |
| *A01D 34/68* | (2006.01) | |
| A01D 101/00 | (2006.01) | |
| A01D 43/063 | (2006.01) | |

(52) U.S. Cl.
CPC .............. *A01D 34/73* (2013.01); *A01D 34/68* (2013.01); *A01D 43/063* (2013.01); *A01D 2101/00* (2013.01)

(58) Field of Classification Search
CPC ........ A01D 34/00; A01D 34/68; A01D 34/73; A01D 34/76; A01D 34/001; A01D 34/008; A01D 34/63; A01D 34/82; A01D 2101/00; A01D 43/063

USPC ..................... 56/10.2 R, 10.4, 196, 289, 295
See application file for complete search history.

(56) References Cited

U.S. PATENT DOCUMENTS

| | | | | |
|---|---|---|---|---|
| 3,385,043 A | * | 5/1968 | Seymore .............. | A01D 34/005 56/503 |
| 3,389,541 A | * | 6/1968 | Freedlander ........... | A01D 34/73 56/295 |
| 3,724,182 A | * | 4/1973 | Long ...................... | A01D 42/00 37/243 |
| 3,762,138 A | * | 10/1973 | Michael ............... | A01D 34/733 56/295 |

(Continued)

FOREIGN PATENT DOCUMENTS

| | | |
|---|---|---|
| JP | 2002-315416 A | 10/2002 |
| JP | 2002-315418 A | 10/2002 |
| JP | 3771529 B2 | 4/2006 |

OTHER PUBLICATIONS

Related co-pending U.S. Appl. No. 15/442,971.
(Continued)

*Primary Examiner* — John Weiss
(74) *Attorney, Agent, or Firm* — Westerman, Hattori, Daniels & Adrian, LLP

(57) ABSTRACT

A lawn mower includes a housing with an opened bottom, a hollow shaft extending in a vertical direction of the housing and including a lower end positioned within the housing, a cutter blade, flaps provided for at least part of the cutter blade in a manner that the flaps have a flap angle changeable along a horizontal line, an actuator for outputting an output to control the flap angle of the flap, and a transmission mechanism accommodated in the hollow shaft for transmitting the output of the actuator to the flaps.

6 Claims, 7 Drawing Sheets

(56) References Cited

U.S. PATENT DOCUMENTS

| | | | | |
|---|---|---|---|---|
| 5,035,108 A | * | 7/1991 | Meyer | A01D 34/685 56/13.4 |
| 5,036,654 A | * | 8/1991 | Malutich | A01D 34/733 56/255 |
| 5,040,364 A | * | 8/1991 | Deegan | A01D 43/0631 56/320.2 |
| 5,259,176 A | * | 11/1993 | Kahamura | A01D 34/73 56/255 |
| 5,383,329 A | * | 1/1995 | Cornell, III | A01D 34/73 56/255 |
| 7,392,643 B2 | * | 7/2008 | Warashina | A01D 34/005 56/17.5 |
| 7,730,708 B2 | * | 6/2010 | Siler | A01D 34/73 56/255 |
| 9,307,695 B2 | * | 4/2016 | Nishihara | A01D 34/63 |
| 2002/0152736 A1 | | 10/2002 | Hasei et al. | |
| 2002/0153179 A1 | | 10/2002 | Kobayashi et al. | |
| 2003/0182916 A1 | | 10/2003 | Iida et al. | |
| 2004/0187463 A1 | * | 9/2004 | Eddy | A01D 34/73 56/295 |
| 2012/0198807 A1 | * | 8/2012 | Upham | A01D 34/73 56/289 |
| 2015/0082763 A1 | * | 3/2015 | Nishihara | A01D 34/63 56/289 |

OTHER PUBLICATIONS

Related co-pending U.S. Appl. No. 15/442,899.
Related co-pending U.S. Appl. No. 15/443,213.
Related co-pending U.S. Appl. No. 15/443,257.
Related co-pending U.S. Appl. No. 15/443,478.

* cited by examiner

LAWN MOWER

CROSS-REFERENCE TO RELATED APPLICATION

This application is based upon and claims the benefit of priority from Japanese Patent Application No. 2016-037306 filed on Feb. 29, 2016, the contents of which are incorporated herein by reference.

BACKGROUND OF THE INVENTION

Field of the Invention

The present invention relates to a technique of a rotary lawn mower for cutting lawn grass by a cutter blade accommodated in a housing.

Description of the Related Art

The rotary lawn mower cuts (clips) lawn grass by rotating a cutter blade accommodated in a housing having an opened bottom, along lawn grass to cut the lawn grass. As a technique of such a lawn mower, for example, Japanese Laid-Open Patent Publication No. 2002-315418 is known.

The lawn mower known in Japanese Laid-Open Patent Publication No. 2002-315418 includes a housing having an opened bottom, a rotation shaft positioned inside the housing and extending in a vertical direction of the housing, and a narrow and long cutter blade accommodated in the housing in a manner that the cutter blade is rotatable about the rotation shaft. This cutter blade has blades and air lifts at both ends in a longitudinal direction. The blades are formed at front edges in a rotation direction of the cutter blade, and the air lifts are formed at rear edges in the rotation direction. When the cutter blades are rotated, the air lifts generate an upward air flow and a swirl air flow. By orienting the lawn grass growing on the lawn ground to stand upright by the upward air flow, it is possible to cut (clip) the lawn grass by the cutter blade efficiently. The lawn grass (grass clippings) cut by the cutter blade is lifted upward, and swirled in the housing by the upward air flow and the swirl air flow generated by the air lifts, and then, transported into a grass clippings container.

SUMMARY OF THE INVENTION

By increasing the rotation speed of the cutter blade, it is possible to improve the lawn mowing performance and the transportation performance for transportation of the cut lawn grass to the grass clippings container. However, the lawn mower produces noises during rotation of the cutter blade. As the rotation speed of the cutter becomes high, the noises tend to get louder. Therefore, there is a demand to generate swirl wind efficiently without changing the rotation speed of the cutter blade in accordance with the working condition for lawn mowing operation.

An object of the present invention is to provide a technique which makes it possible to generate swirl wind efficiently for swirling grass clippings in the housing and transporting the grass clippings into the grass clippings container without changing the rotation speed of the cutter blade in accordance with the working condition of lawn mowing operation.

In the present invention, a lawn mower includes a housing with an opened bottom, a rotation shaft extending in a vertical direction of the housing and including a lower end positioned within the housing, and a cutter blade provided for the rotation shaft, and accommodated in the housing. The cutter blade extends along a horizontal line which is perpendicular (or substantially perpendicular) to the rotation shaft. Further, the lawn mower includes a flap provided for at least part of the cutter blade in a manner that the flap has a flap angle changeable along the horizontal line, an actuator configured to provide an output to control the flap angle of the flap, and a transmission mechanism configured to transmit the output of the actuator to the flap.

Therefore, the flap angle of the flap of the cutter blade can be set to the optimum angle by the actuator as necessary in accordance with the working condition of the lawn mower. Thus, swirl wind can be generated by the flap efficiently, in accordance with the working condition of the lawn mowing operation. The lawn grass (grass clippings) cut by the cutter blade can be swirled by the swirl wind efficiently in the housing, and transported into the grass clippings container efficiently. Accordingly, it is possible to improve the energy consumption efficiency in the drive source (power source) for driving the cutter blade. Further, it is not necessary to change the rotation speed of the cutter blade.

Further, it is possible to control the flap angle of the flap in accordance with the load state of the cutter blade and/or the negative pressure state in the housing. By controlling the flap angle, it is possible to sufficiently suppress the jamming phenomenon of the grass clippings which may occur in the transportation path of the grass clippings from the housing to the grass clipping container.

Further, during the operation at low load where, e.g., the cutter blade is rotated idly, and no grass clipping operation is performed, by decreasing the flap angle of the flap, it is possible to reduce the noises such as wind noises. Further, it is possible to improve the noise suppression performance regardless of the rotation speed of the cutter blade.

Further, when the grass clippings are blown by the swirl wind to store the grass clippings in the grass clipping container, by setting the flap angle of the flap as necessary, it is possible to adjust the distance by which the grass clippings fly over the swirl wind. Consequently, it is possible to efficiently store the grass clippings in the grass clippings container.

Further, the rotation shaft comprises a hollow shaft. The transmission mechanism is accommodated inside the hollow shaft. That is, the transmission mechanism is provided by utilizing the rotation shaft effectively. In the structure, by accommodating in the hollow rotation shaft the transmission mechanism that transmits the output of the actuator to the flap, it is possible to efficiently provide the transmission mechanism in a compact space in the housing efficiently. Further, since the transmission mechanism is not exposed into the housing, there is no concern of jamming between the transmission mechanism and the housing. Further, the swirl wind generated by the cutter blade or the flap can flow smoothly into the housing without being obstructed by the transmission mechanism. Therefore, though the transmission mechanism is present, it is possible to store the grass clippings efficiently in the grass clippings container by allowing the grass clippings to fly on the swirl wind flowing smoothly.

Preferably, the transmission mechanism includes a control shaft fitted in the hollow shaft in a manner that the control shaft is slidable in an axial direction; and a conversion mechanism accommodated inside the hollow shaft. The conversion mechanism is capable of converting sliding movement of the control shaft into movement to change the flap angle of the flap. A lower end of the control shaft is coupled to the flap through the conversion mechanism. An output shaft of the actuator is combined with an upper end of the control shaft in a manner that the control shaft can be driven to move in a sliding manner.

Thus, the control shaft is driven by the actuator to move in a sliding manner, and the sliding movement of the control shaft can be converted into movement to change the flap angle of the flaps. As a result, the flap angle can be controlled by the actuator. Further, the transmission mechanism is made up of the control shaft fitted into the hollow shaft in a slidable manner in the axial direction, and the conversion mechanism accommodated inside hollow shaft. Therefore, by effectively utilizing the inner space of the hollow rotation shaft, the transmission mechanism can be stored efficiently.

Preferably, the conversion mechanism includes a pin extending radially outward from the lower end of the control shaft, and a cam including a cam surface which can contract the pin. The cam is rotatably supported by the hollow shaft about a swing center of the flap, and provided for the flap. The cam surface comprises a cam groove capable of converting sliding movement of the pin which is displaced vertically together with the control shaft in a sliding manner into rotation movement of the cam.

In the structure, by the cam mechanism including the pin and the cam, it is possible to form the simple and compact conversion mechanism. Further, the sliding movement of the control shaft can be converted into the movement for changing the flap angle of the flap.

More preferably, the cam groove is formed around the swing center of the flap, and has a V-shape oriented substantially in a lateral direction.

In the structure, by changing the slide direction of driving the control shaft by the actuator, it is possible to change the swing direction of the flap. For example, the swing direction of the flap can be changed from upward to downward. In this case, by reversing rotation of the rotation shaft (hollow shaft), it is possible to generate an upward air flow by the flap. As described above, the swing direction of the flap and the rotation direction of the rotation shaft can be combined as necessary, in accordance with the usage condition of the lawn mower.

Preferably, the actuator comprises a linear actuator including the output shaft slidable in the axial direction of the control shaft. A roller bearing is interposed between the output shaft and the control shaft.

In the structure, when the control shaft and the hollow shaft are rotated together, the frictional resistance between the output shaft of the linear actuator and the control shaft can be reduced as much as possible. Therefore, even if the control shaft is rotated at high speed, it is possible to promptly and reliably drive the control shaft to move in a sliding manner by the linear actuator. Even during rotation of the cutter blade, it is possible to set the flap angle promptly and reliably to the optimum angle in correspondence with the working condition of the lawn mower.

Preferably, the lawn mower further includes a lower cutter blade positioned below the cutter blade. The lower cutter blade comprises a fixed blade fixed to the hollow shaft.

When the cutter blade having the flap is rotated, it is possible to generate the upward air flow by the flap. The magnitude of this upward air flow depends on the degree of the flap angle of the flap. Negative pressure is generated below the cutter blade by the upward air flow. In correspondence with the magnitude of this negative pressure, the degree in which the lawn grass growing on the ground stands upright changes. In this case, for ensuring that the lawn grass after lawn mowing operation has the constant height as much as possible, it is more preferable to adjust the height of the housing having the cutter blade finely.

In this regard, the lower cutter blade is positioned below the cutter blade. This lower cutter blade comprises a fixed blade which does not have any flap. Therefore, the magnitude of the negative pressure generated below the lower cutter blade by the upward air flow is substantially constant. The degree in which the lawn grass growing on the ground stands upright is substantially constant. It is possible to maintain the constant height of lawn grass after lawn mowing operation as much as possible.

Therefore, it is possible to efficiently generate the swirl wind by the flaps of the upper cutter blade, and ensure that the lawn grass has the constant height after lawn mowing operation by the lower cutter blade as much as possible. It is possible to reduce the working operation for finely adjusting the height of the housing.

In the present invention, it is possible to efficiently generate swirl wind for swirling lawn grass in the housing and transporting the lawn grass to the grass clippings container without changing the rotation speed of the cutter blade, in accordance with the working condition for lawn mowing operation.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment for carrying out the present invention will be described with reference to the accompanying drawings.

A lawn mower according to the embodiment will be described with reference to the drawings. It should be noted that, in the following description, the words "front", "rear", "left", "right", "upper", and "lower" are used to refer to directions as viewed from a human operator. "Fr" denotes the front side, "Rr" denotes the rear side", "Le" denotes the left side, "Ri" denotes the right side, and the "CL denotes" the center of the machine width (central line of the machine width).

Figure 1:
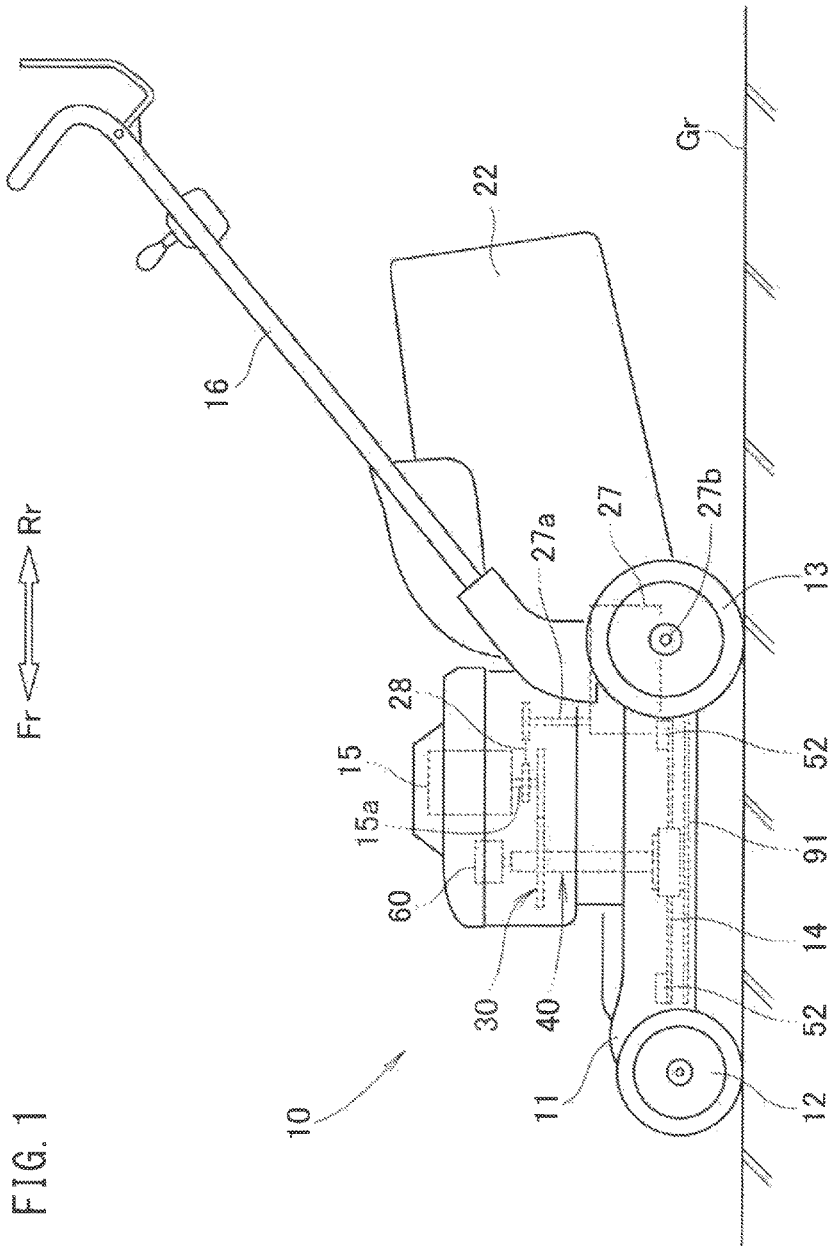
FIG. 1 is a left side view of a lawn mower of the present invention.
Figure 2:
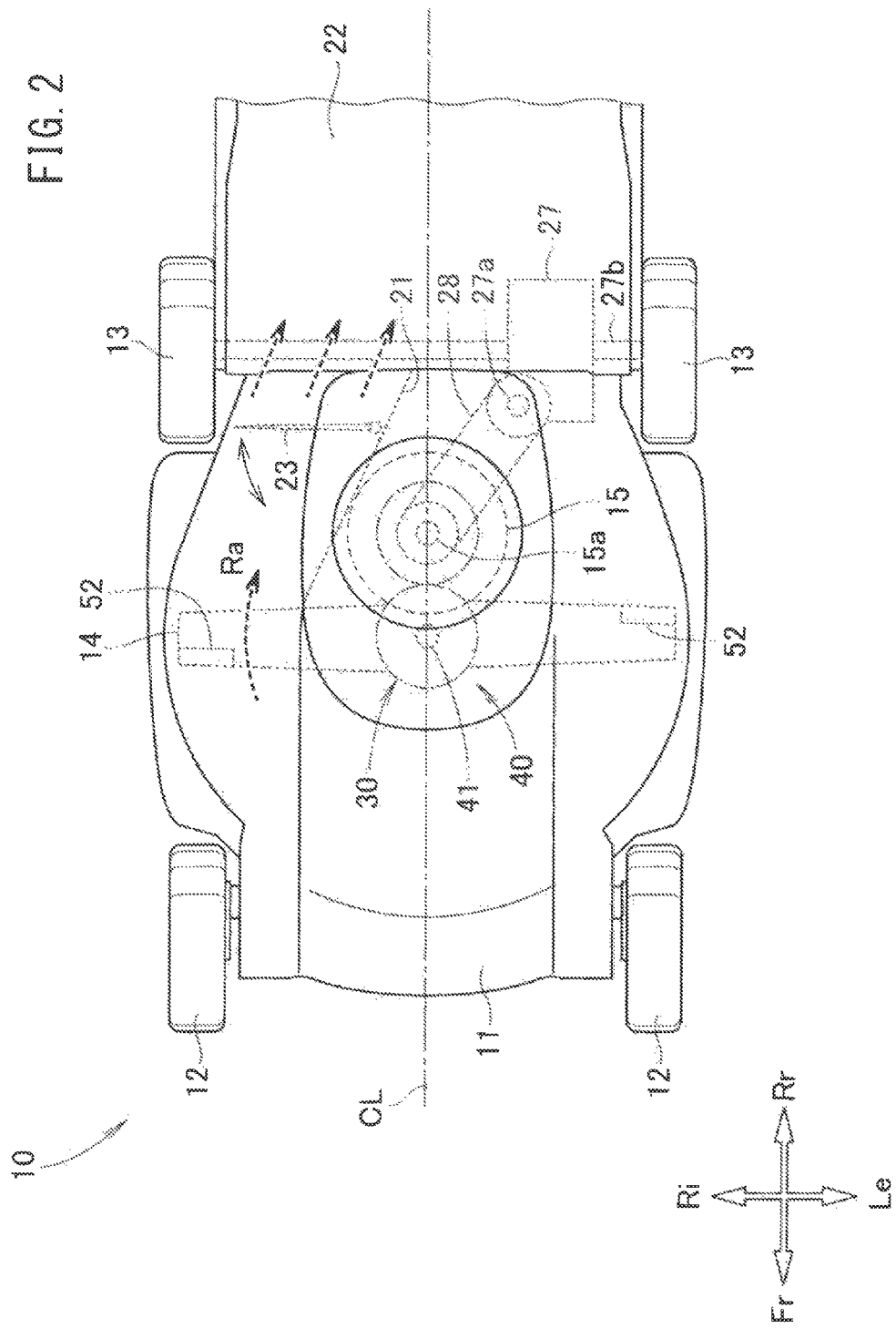
FIG. 2 is a plan view of the lawn mower shown in FIG. 1.

As shown in FIGS. 1 and 2, a lawn mower 10 is a walk-behind, self-propelled working machine for cutting lawn grass. The lawn mower 10 includes a housing 11, left and right wheels 12 provided on the front side of the housing 11, left and right wheels 13 provided on the back side of the housing 11, a cutter blade 14 accommodated inside the center of the housing 11 for cutting lawn grass, a drive source 15 (engine 15) provided above the housing 11, and an operation handle 16 extending backward from the housing 11. In the following description, a case where the drive source 15 is an engine is taken as an example. It should be noted that the drive source 15 is not limited to the engine. For example, the drive source 15 may be an electric motor.

As shown in FIG. 2, in a plan view, this lawn mower 10 rotates the cutter blade 14 clockwise by the engine 15 to cut (clip) the lawn grass, and generates flows of the air (swirl air flow or swirl wind) in the housing 11 as indicated by an arrow Ra. By the swirl air flow, the lawn grass cut by the cutter blade 14 can be delivered to, and stored in a grass clippings container 22 through a grass clippings discharge passage 21. Hereinafter, the lawn grass cut (clipped) by the cutter blade 14 will be referred to as the "grass clippings".

As shown in FIG. 1, this housing 11 is a so-called opened bottom housing where only the lower end surface (surface facing the lawn ground Gr) of the housing 11 is opened entirely. This housing 11 is a member having a spiral shape in a plan view, i.e., a spiral case (scroll case). The housing 11 has a scroll section for swirling the lawn grass cut by the cutter blade 14 by the swirl wind, and transporting the lawn grass (grass clippings) toward the grass clippings discharge passage 21. Structure of this housing 11 is well known (see Japanese Patent No. 3771529).

As shown in FIG. 2, a mode switch damper 23 is provided for the grass clippings discharge passage 21. This mode switch damper 23 can be operated by an unillustrated operation lever. By operating the operation lever, it is possible to switch the operating mode as necessary, between (1) a bagging mode for opening the mode switch damper 23 to store the grass clippings in the grass clippings container 22 and (2) a mulching mode for closing the mode switch damper 23 to discharge the grass clippings to a position below the housing 11.

Figure 3:
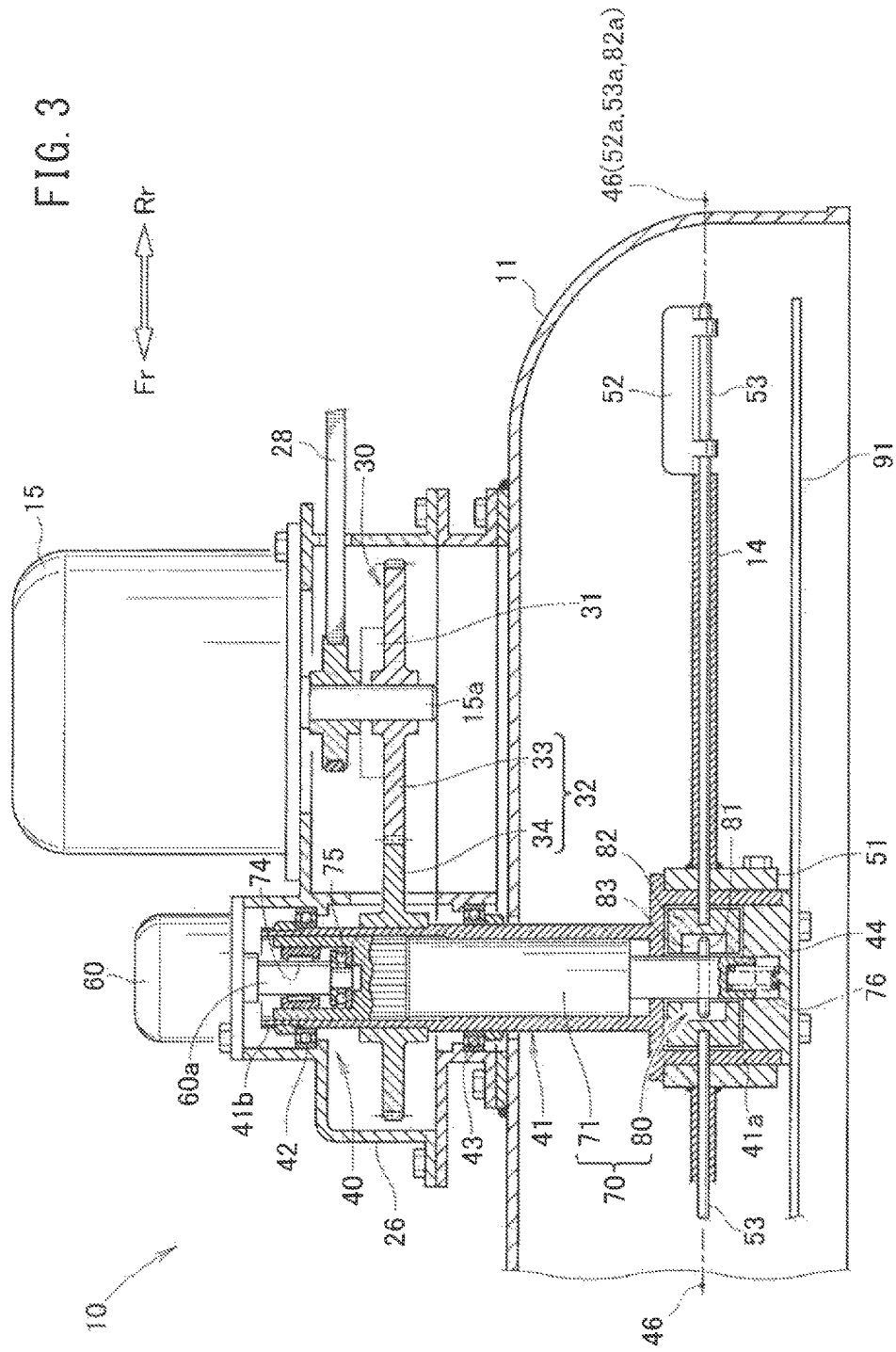
FIG. 3 is a cross sectional view showing a drive source, a cutter mechanism, and an area around a cutter blade shown in FIG. 1.

As shown in FIG. 3, this housing 11 also serves as a machine body, and includes a stand 26 at an upper position. The engine 15 is mounted on an upper end surface of this stand 26. The engine 15 has an output shaft 15*a* extending from its lower end toward the lawn ground Gr (ground Gr) into the housing 11. The output shaft 15*a* is a rotation shaft positioned above the housing 11, and extends in a vertical direction (in an up-down direction) of the housing 11. Consequently, the output shaft (rotation shaft) 15*a* is substantially perpendicular to the horizontal lawn ground Gr.

As shown in FIGS. 1 and 3, the left and right rear wheels 13 are travel drive wheels. That is, the power generated by the engine 15 is transmitted to the left and right rear wheels 13 through a transmission 27 (hydraulic continuously variable transmission 27). An input shaft 27*a* of the hydraulic continuously variable transmission 27 is coupled to the output shaft 15*a* of the engine 15 by a belt 28. This hydraulic continuously variable transmission 27 can switch (reverse) the rotation direction of an output shaft 27*b* (wheel shaft 27*b*) outputted to the rear wheels 13, in response to the rotation direction of the input shaft 27*a* driven by the engine 15, and switch (change the transmission) of the rotation speed of the output shaft 27*b* continuously, in response to the rotation speed of the input shaft 27*a*. The structure of this hydraulic continuously variable transmission 27 is well known (e.g., see Japanese Laid-Open Patent Publication No. 2002-315416).

As shown in FIG. 3, the power generated by the engine 15 is transmitted to a cutter mechanism 40 by a working power transmission system 30. A clutch 31 and a power transmission mechanism 32 are provided in the working power transmission system 30 from the engine 15 to a rotation shaft 41 of the cutter mechanism 40. The power transmission mechanism 32 is made up of a drive gear 33 and a driven gear 34. The drive gear 33 is attached to the output shaft 15*a* of the engine 15 through the clutch 31. The driven gear 34 is attached to an upper end 41*b* of the rotation shaft 41. These gears 33, 34 are spur gears. When the clutch 31 is in the OFF state, the rotation shaft 41 is released from the output shaft 15*a* of the engine 15. When the clutch 31 is in the ON state, the rotation shaft 41 is coupled to the output shaft 15*a* of the engine 15. Hereinafter, this cutter mechanism 40 and the cutter blade 14 will be described in detail.

Figure 4:
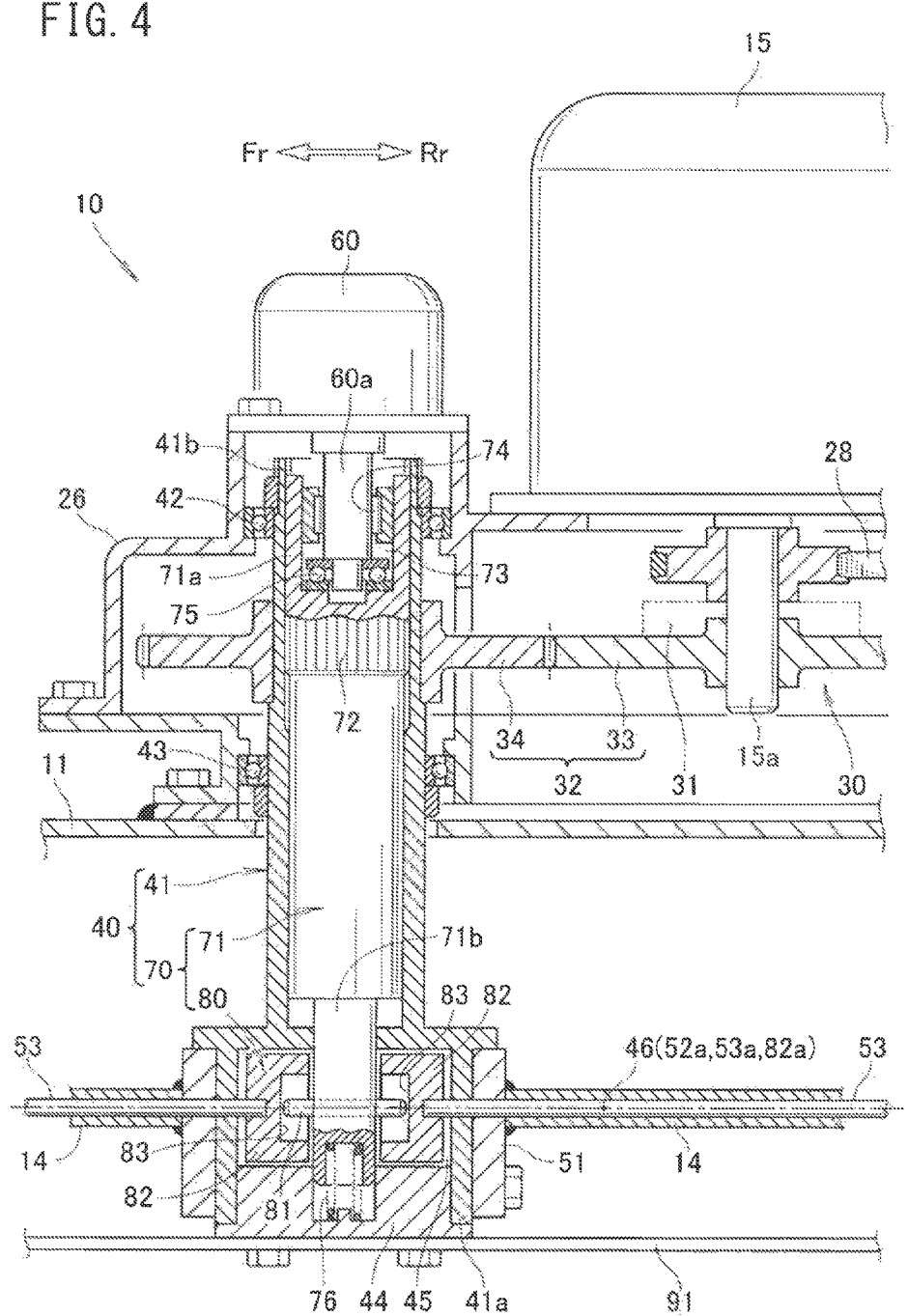
FIG. 4 is a cross sectional view in which the cutter mechanism and the area around the cutter blade shown in FIG. 3 are enlarged.

As shown in FIG. 4, the cutter mechanism 40 includes the rotation shaft 41 and a transmission mechanism 70. This transmission mechanism 70 will be described later. The rotation shaft 41 extends in a vertical direction of the housing 11. The rotation shaft 41 is positioned in parallel to the output shaft 15*a* of the engine 15. This rotation shaft 41 is supported by bearings 42, 43 in a manner that the rotation shaft 41 is rotatable but restricted axially with respect to the stand 26. Consequently, the rotation shaft 41 is supported in a manner that the rotation shaft 41 is rotatable with respect to the housing 11, and movement of the rotation shaft 41 in the axial direction is restricted.

The rotation shaft 41 is a hollow shaft. Hereinafter, this rotation shaft 41 will also be referred to as the "hollow shaft 41" as necessary. A lower end 41*a* of the rotation shaft 41 is positioned within the housing 11. The diameter of this lower end 41*a* of the rotation shaft 41 is larger than the other portion of the rotation shaft 41. The lower end 41*a* is opened downward to have a substantially cup shape. The opened end surface in the lower end 41*a* is closed by a cap 44. The cap 44 is detachably attached to the lower end 41*a* of the rotation shaft 41 by a fixing member such as a bolt. The inside of the lower end 41*a* and the cap 44 form a space 45.

Figure 5:
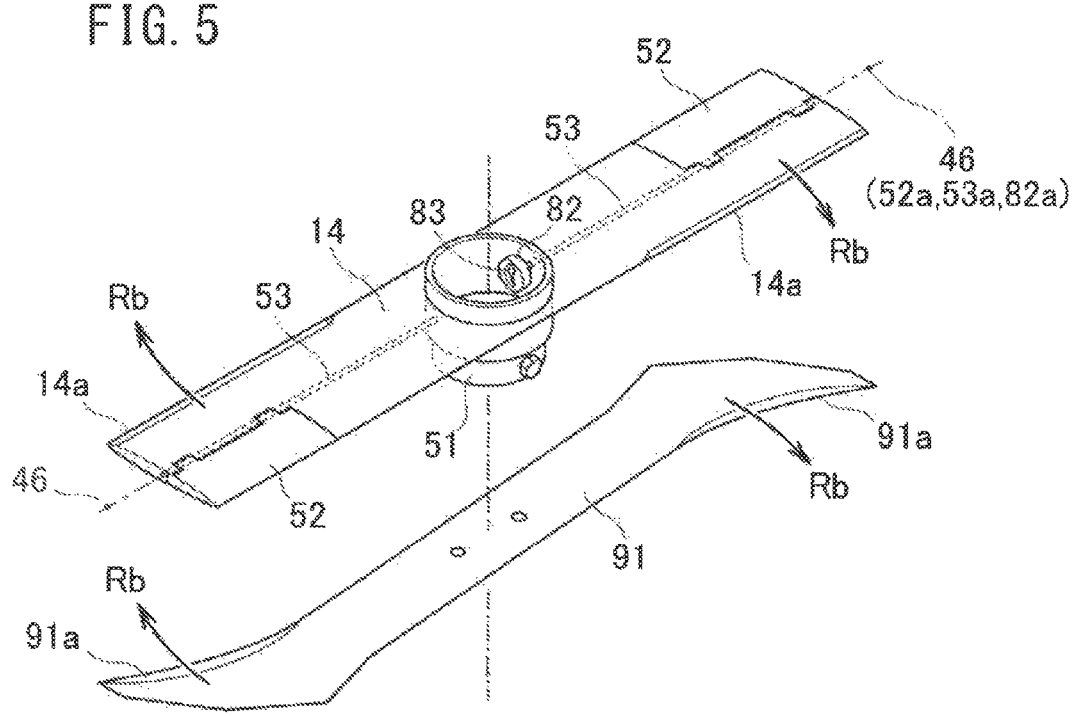
FIG. 5 is an exploded perspective view showing the cutter blade and a lower cutter blade shown in FIG. 3.

As shown in FIGS. 4 and 5, the cutter blade 14 is provided for the rotation shaft 41, and placed in the housing 11. This cutter blade 14 is a long narrow member having a substantially flat plate shape in a plan view, extending in a horizontal line 46 perpendicular to (or substantially perpendicular to) the rotation shaft 41. Both ends of the cutter blade 14 in the longitudinal direction have a pair of blades 14*a*, at front edges of the cutter blade 14 in the rotation direction.

Further, an annular hub 51 is provided at the center of the cutter blade 14 in the longitudinal direction. The hub 51 is an annular member fitted to an outer circumferential surface of the lower end 41*a* of the rotation shaft 41. The hub 51 is detachably attached to the lower end 41*a* by a fixing member such as a bolt. Therefore, the cutter blade 14 is rotatable together with the rotation shaft 41.

Figure 6:
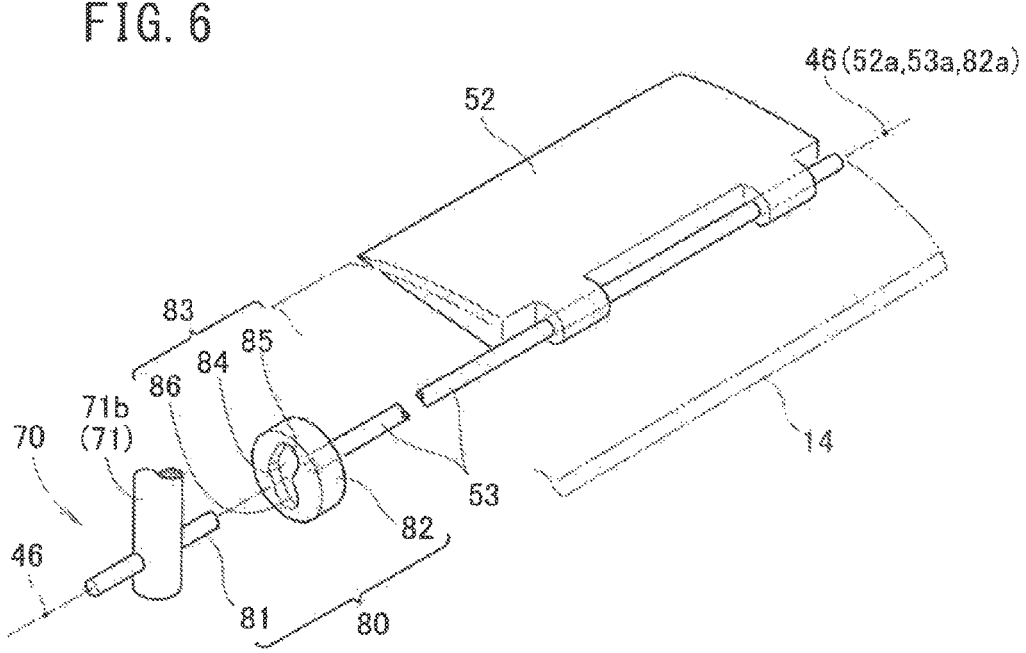
FIG. 6 is an exploded view showing a cutter blade, a flap, and an area around a conversion mechanism shown in FIG. 5.

As shown in FIGS. 3, 5, and 6, flaps 52 are formed at least at part of the cutter blade 14. The range of the flaps 52 in the cutter blade 14 may be any of, only part of the cutter blade 14, the half of the front end of the cutter blade 14, and the entire cutter blade 14.

For example, the flaps 52 are provided at both ends of the cutter blade 14 in the longitudinal direction. The flaps 52 are provided opposite to the pair of blades 14*a* with respect to the cutter blade 14. The cutter blade 14 is cut out for the space required for providing the flaps 52.

The flap angle (upper and lower swing angles) of the flaps 52 can be changed along the horizontal line 46. More specifically, two flap support shafts 53 (as a pair) are provided on the horizontal line 46. The flap support shafts 53 are provided concentrically with each other. One end of each of the pair of flap support shafts 53 extends through the hub 51, into the space 45 (see FIG. 4) of the lower end 41*a* of the rotation shaft 41. Further, the one end of each of the pair of the flap support shafts 53 is rotatably supported by the hub 51. The movement of the flap support shaft 53 in the axial direction is restricted.

The pair of flaps 52 is attached to the pair of the flap support shafts 53. In the structure, the flaps 52 can swing in accordance with rotation of the flap support shafts 53 vertically (direction of the upper and lower surfaces of the flaps 52) about the flap support shafts 53. That is, the flaps 52 are auxiliary blades that can swing up and down along the horizontal line 46 (in the longitudinal direction of the cutter blade 14). Hereinafter, the flaps 52 will also be referred to as the "auxiliary blades 52" as necessary.

As shown in FIGS. 3 and 4, the flap angle of the flaps 52 is controlled by an output from an actuator 60. That is, the output of the actuator 60 is transmitted to the flaps 52 by the transmission mechanism 70. This transmission mechanism 70 is accommodated inside the hollow shaft 41 (rotation shaft 41). The transmission mechanism 70 is made up of a control shaft 71 and a conversion mechanism 80.

The control shaft 71 is slidable in the axial direction with respect to the hollow shaft 41, and relative rotation of the control shaft 71 with respect to the hollow shaft 41 is restricted, and the control shaft 71 is fitted into the hollow shaft 41. Specifically, the control shaft 71 is slidable along the hollow shaft 41 by a spline 72, and relative rotation of the control shaft 71 is restricted. It should be noted that the control shaft 71 may adopt structure using serration or parallel keys instead of the spline 72.

The actuator 60 is a linear actuator. That is, an output shaft 60*a* of the actuator 60 is slidable in the axial direction of the control shaft 71. The output shaft 60*a* and the control shaft 71 are positioned concentrically with respect to the hollow shaft 41.

The output shaft 60*a* of the actuator 60 is combined with an upper end 71*a* of the control shaft 71 in a manner that the control shaft 71 can be driven to move in a sliding manner. More specifically, a recess 73 having a circular shape in cross section is formed at an upper end of the control shaft 71. The recess 73 is opened upward. The output shaft 60*a* of the actuator 60 is fitted to the recess 73.

Two roller bearings 74, 75 are interposed between the output shaft 60*a* of the actuator 60 and the control shaft 71. One of the roller bearings 74, 75 is a radial bearing 74, and the other of the roller bearings 74, 75 is a thrust bearing 75. It should be noted that the two roller bearings 74, 75 may comprise needle bearings. The outer circumferential surface of the output shaft 60*a* is supported by the radial bearing 74 in a manner that the outer circumferential surface of the output shaft 60*a* is rotatable, and slidable on the inner circumferential surface of the recess 73. The lower end surface of the output shaft 60*a* rotatably contacts the bottom surface of the recess 73 through the thrust bearing 75. The output shaft 60*a* moves down to displace the control shaft 71 in a sliding manner through the thrust bearing 75.

A lower end 71*b* of the control shaft 71 extends into the space 45, and faces an upper surface of the cap 44. A compression coil spring 76 (return spring 76) is interposed between the lower end surface of the control shaft 71 and the upper surface of the cap 44. The compression coil spring 76 biases the control shaft 71 toward the lower end surface of the output shaft 60*a* of the actuator 60. In the structure, the lower end surface of the output shaft 60*a* contacts the bottom surface of the recess 73 through the thrust bearing 75 all the time. As the output shaft 60*a* moves upward, the compression coil spring 76 can displace the control shaft 71 upward in a sliding manner. Consequently, the control shaft 71 is synchronized with forward/backward movement of the output shaft 60*a* of the actuator 60, and can slide vertically in the same direction as the output shaft 60*a*.

The conversion mechanism 80 is capable of converting the slide movement of the control shaft 71 into movement to change the flap angle of the flaps 52, i.e., swing movement, and the conversion mechanism 80 is accommodated inside the hollow shaft 41 (i.e., the space 45). That is, the lower end 71*b* of the control shaft 71 is coupled to the flaps 52 through the conversion mechanism 80.

As shown in FIGS. 4 to 7D, this conversion mechanism 80 includes a pin 81 and a pair of cams 82. The pin 81 extends outside toward both sides in the radial direction from the lower end 71*b* of the control shaft 71. For example, the pin 81 passes through the lower end 71*b* in the radial direction.

The two cams 82 (as a pair) are circular disk members. Each of the cams 82 is connected to one end of each of the pair of flap support shafts 53. The pair of cams 82 is rotatable about the pair of the flap support shafts 53, and supported at the lower end 41*a* of the rotation shaft 41. As described above, the pair of cams 82 is rotatably supported by the hollow shaft 41 about a swing center 52*a* (horizontal line 46) of the flaps 52, and provided at the flaps 52 by the flap support shafts 53.

The cams 82 have cam surfaces 83 which can contact the pin 81. The cam surfaces 83 face each other. The front end of the pin 81 can contact the cam surfaces 83. These cam surfaces 83 are formed by cam grooves which are configured to convert the sliding movement of the pin 81 which is displaced vertically together with the control shaft 71 into the rotation movement of the cams 82. Hereinafter, the cam surfaces 83 will also be referred to as the "cam grooves 83" as necessary. The outer circumferential surface of the pin 81 slides along the side surfaces of the cam grooves 83, and can be displaced vertically. As a result, the cam 82 is rotated.

Figure 7A:
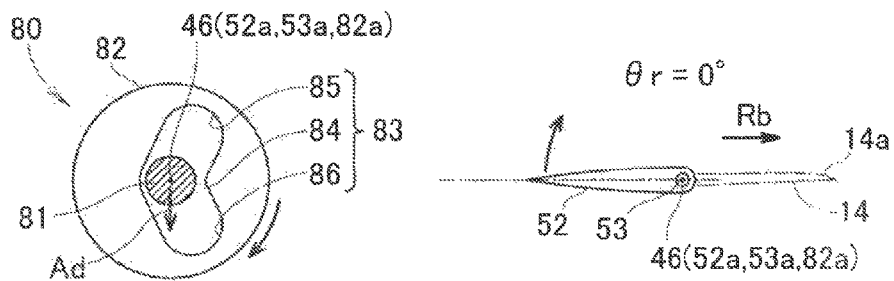
FIG. 7A is a view showing a first relationship between the flap and the conversion mechanism shown in FIG. 6.

As shown in FIGS. 6 and 7A, this cam groove 83 is formed around the swing center 52*a* of the flap 52, and has a V-shape oriented substantially in a lateral direction. In this regard, the swing center 52*a* of the flap 52 is in alignment with a center 53*a* of the flap support shaft 53 and a rotation center 82*a* of the cam 82. The swing center 52*a* of the flap 52 is positioned along the horizontal line 46 perpendicular to the rotation shaft 41. More specifically, the cam groove 83 includes a groove center 84 positioned on the rotation center 82*a* of the cam 82, an upper groove 85 extending upward obliquely from the groove center 84, and a lower groove 86 extending downward obliquely from the groove center 84. The groove center 84, the upper groove 85, and the lower groove 86 are continuous.

Next, operation relationship between the conversion mechanism 80 and the flaps 52 will be described with reference to FIGS. 7A to 7D. FIG. 7A shows the relationship between the conversion mechanism 80 and the flap 52 when the flap 52 is in the horizontal state (flap angle $\theta r=0°$). At this time, the pin 81 is positioned at the groove center 84 (the rotation center 82*a* of the cam 82). The cutter blade 14 is rotated in a direction indicated by an arrow Rb together with the flap 52 in the horizontal state. Thus, the cutter blade 14 can cut (clip) the lawn grass.

Figure 7B:
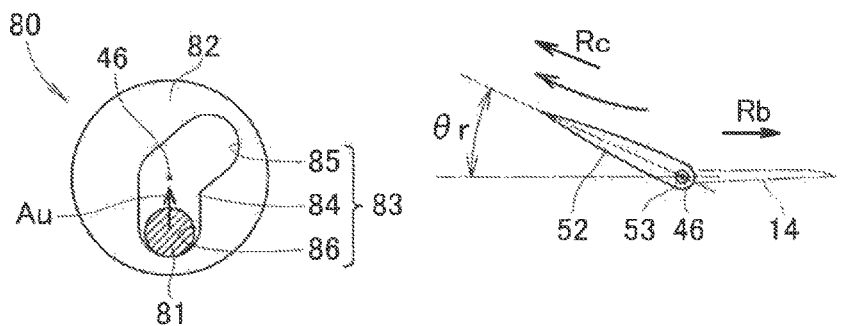
FIG. 7B is a view showing a second relationship between the flap and the conversion mechanism shown in FIG. 6.

Thereafter, the pin 81 is displaced downward (in a direction indicated by an arrow Ad) together with the control shaft 71 shown in FIG. 6, to push the side wall of the lower groove 86 of the cam groove 83 downward. Since the cam 82 and the flap support shaft 53 are rotated clockwise, the flap 52 swings upward. The result is shown in FIG. 7B. The degree of the swing angle θr at which the flap 52 swings from the horizontal state, i.e., the degree of the flap angle θr corresponds to the downward displacement amount of the control shaft 71. By rotation of the cutter blade 14, the flap 52 generates upward air flow Rc.

Thereafter, the pin 81 is displaced upward (in a direction indicated by an arrow Au) together with the control shaft 71 shown in FIG. 6. The pin 81 is in the so-called "missed swing" state where the pin 81 is only displaced upward in the lower groove 86 until the pin 81 returns to the groove center 84. Therefore, the flap angle θr of the flap 52 does not change.

Figure 7C:
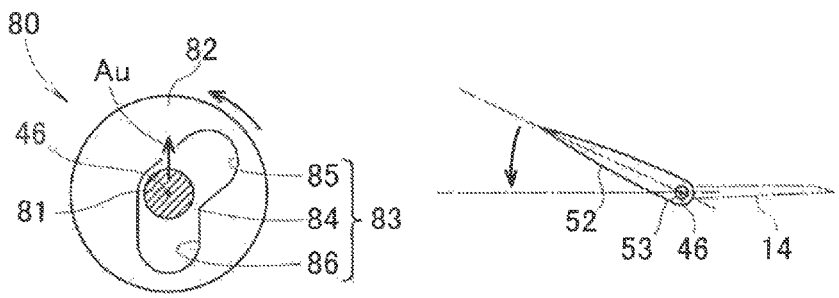
FIG. 7C is a view showing a third relationship between the flap and the conversion mechanism shown in FIG. 6.
Figure 7D:
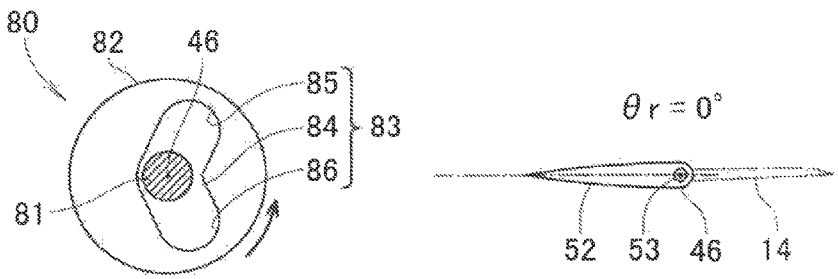
FIG. 7D is a view showing a fourth relationship between the flap and the conversion mechanism shown in FIG. 6.

Thereafter, as shown in FIG. 7C, the pin 81 is displaced further upward from the groove center 84 (in a direction indicated by an arrow Au) to push the side wall of the upper groove 85 upward. Since the cam 82 and the flap support shaft 53 are rotated counterclockwise in the drawing, the flap 52 swings downward. The result is shown in FIG. 7D. The flap 52 returns to the horizontal state (flap angle θr=0°).

The above explanation is summarized below. As shown in FIGS. 4, 5, 7A to 7D, the lawn mower 10 includes the flaps 52 (auxiliary blades 52) provided along the horizontal line 46, at least at part of the cutter blade 14 in a manner that the flap angle θr (swing angle θr) can be changed, the actuator 60 having (generating) an output to control the flap angle θr of the flaps 52, and the transmission mechanism 70 for transmitting the output of the actuator 60 to the flaps 52.

Therefore, the flap angle θr of the flaps 52 of the cutter blade 14 can be set to the optimum angle by the actuator 60 as necessary in accordance with the working condition of the lawn mower 10. Thus, swirl wind can be generated by the flaps 52 efficiently, in accordance with the working condition for lawn mowing operation. The grass clippings can be swirled by the swirl wind efficiently in the housing 11, and transported into the grass clippings container 22 (see FIG. 2) efficiently. Accordingly, it is possible to improve the energy consumption efficiency in the drive source (power source) 15 for driving the cutter blade 14. Further, it is not necessary to change the rotation speed of the cutter blade 14.

Further, it is possible to control the flap angle θr of the flaps 52 in accordance with the load state of the cutter blade 14 and/or the negative pressure state in the housing 11. By controlling the flap angle θr of the flaps 52, it is possible to sufficiently suppress the jamming phenomenon of the grass clippings which may occur in the transportation path of the grass clippings from the housing 11 to the grass clippings container 22.

Further, during the operation at low load where, e.g., the cutter blade 14 is rotated idly, and no grass clipping operation is performed, by decreasing the flap angle θr of the flaps 52, it is possible to reduce the noises such as wind noises. Further, it is possible to improve the noise suppression performance regardless of the rotation speed of the cutter blade 14.

Further, when the grass clippings are blown by the swirl wind to store the grass clippings in the grass clippings container 22, by setting the flap angle θr of the flaps 52 as necessary, it is possible to adjust the distance by which the grass clippings fly over the swirl wind. Consequently, it is possible to efficiently store the grass clippings in the grass clippings container 22.

Further, as shown in FIG. 4, the transmission mechanism 70 is accommodated inside the hollow shaft 41. That is, the transmission mechanism 70 is provided by utilizing the rotation shaft 41 effectively. By accommodating the transmission mechanism 70 in the hollow rotation shaft 41, it is possible to efficiently provide the transmission mechanism 70 in a compact space in the housing 11 efficiently. Further, since the transmission mechanism 70 is not exposed into the housing 11, there is no concern of jamming between the transmission mechanism 70 and the housing 11. Further, the swirl wind generated by the cutter blade 14 or the flaps 52 can flow smoothly into the housing 11 without being obstructed by the transmission mechanism 70. Therefore, though the transmission mechanism 70 is present, it is possible to store the grass clippings efficiently in the grass clippings container 22 by allowing the grass clippings to fly over the swirl wind which flows smoothly.

Further, as shown in FIG. 4, the transmission mechanism 70 includes the control shaft 71 and the conversion mechanism 80. The lower end 71b of the control shaft 71 is coupled to the flaps 52 through the conversion mechanism 80. The output shaft 60a of the actuator 60 is combined with the upper end 71a of the control shaft 71 in a manner that the control shaft 71 can be driven to move in a sliding manner. Thus, the control shaft 71 is driven by the actuator 60 to move in a sliding manner, and the sliding movement of the control shaft 71 can be converted by the conversion mechanism 80 into movement to change the flap angle θr of the flaps 52. As a result, the flap angle θr can be controlled by the actuator 60. Further, the transmission mechanism 70 is made up of the control shaft 71 fitted into the hollow shaft 41 in a slidable manner in the axial direction, and the conversion mechanism 80 accommodated inside the hollow shaft 41. Therefore, the transmission mechanism 70 can be accommodated efficiently in the rotation shaft 41, by effectively utilizing the inner space of the hollow rotation shaft 41.

Further, as shown in FIG. 4, by the cam mechanism made up of the pin 81 and the cams 82, it is possible to form the simple and compact conversion mechanism 80. Further, the sliding movement of the control shaft 71 can be converted into movement of changing the flap angle θr of the flaps 52 promptly.

Further, as shown in FIGS. 4 and 6, the cam groove 83 is formed in a V-shape substantially oriented laterally, around the swing center 52a of the flaps 52. In the structure, by changing the slide direction of driving the control shaft 71 by the actuator 60, it is possible to change the swing direction of the flaps 52. For example, the swing direction of the flaps 52 can be changed from upward to downward. In this case, by reversing rotation of the rotation shaft 41, it is possible to generate an upward air flow by the flaps 52. As described above, the swing direction of the flaps 52 and the rotation direction of the rotation shaft 41 can be combined as necessary, in accordance with the usage condition of the lawn mower 10.

Further, as shown in FIG. 4, the roller bearings 74, 75 are interposed between the output shaft 60a of the linear actuator 60 and the control shaft 71. In the structure, when the control shaft 71 and the hollow shaft 41 are rotated together, the frictional resistance between the output shaft 60a of the linear actuator 60 and the control shaft 71 can be reduced as much as possible. Therefore, even if the control shaft 71 is rotated at high speed, it is possible to promptly and reliably drive the control shaft 71 to move in a sliding manner by the linear actuator 60. Even during rotation of the cutter blade 14, it is possible to set the flap angle θr of the flaps 52 promptly and reliably to the optimum angle in accordance with the working condition of the lawn mower 10.

In this regard, when the cutter blade 14 having the flaps 52 shown in FIGS. 1 and 3 is rotated, it is possible to generate the upward air flow by the flaps 52. The magnitude of this upward air flow depends on the degree of the flap angle θr of the flaps 52. Negative pressure is generated below the cutter blade 14 by the upward air flow. In correspondence with the magnitude of this negative pressure, the degree in which the lawn grass growing on the lawn ground Gr (ground Gr) stands upright changes. For ensuring that the lawn grass after lawn mowing operation has a constant height as much as possible, it is more preferable to adjust the height of the housing 11 having the cutter blade 14 finely.

In this regard, as shown in FIGS. 4 and 5, a lower cutter blade 91 is positioned below the cutter blade 14. This lower cutter blade 91 comprises a fixed blade fixed to the rotation shaft 41 (hollow shaft 41). That is, the lower cutter blade 91 is removably attached to the cap 44 by a fixing member such as a bolt. In the structure, the lower cutter blade 91 is rotatable together with the rotation shaft 41. This lower cutter blade 91 is a narrow and long member having a substantially flat plate shape in a plan view, and basically extends along the cutter blade 14. This lower cutter blade 91 may be positioned in slightly out of phase with the cutter blade 14. Two blades 91a (as a pair) are provided at both ends of the lower cutter blade 91 in the longitudinal direction. The blades 91a are formed on the front edges of the lower cutter blade 91 in the rotation direction Rb.

Therefore, the magnitude of the negative pressure generated below the lower cutter blade 91 by the upward air flow is substantially constant. The degree in which the lawn grass growing on the lawn ground Gr (ground Gr) stands upright is substantially constant. It is possible to keep the height of lawn grass after lawn mowing operation as constant as possible.

Therefore, it is possible to efficiently generate the swirl wind by the flaps 52 of the upper cutter blade 14, and ensure that the lawn grass has the constant height after lawn mowing operation by the lower cutter blade 91 as much as possible.

The lawn mower 10 of the present invention is suitably adopted as a walk-behind lawn mower.

While the invention has been particularly shown and described with reference to a preferred embodiment, it will be understood that variations and modifications can be effected thereto by those skilled in the art without departing from the scope of the invention as defined by the appended claims.

What is claimed is:

1. A lawn mower comprising:
   a housing including an opened bottom;
   a rotation shaft extending in a vertical direction of the housing and including a lower end positioned within the housing;
   a cutter blade provided for the rotation shaft and accommodated in the housing, the cutter blade extending along a horizontal line which is perpendicular to the rotation shaft;
   a flap provided for at least part of the cutter blade, the flap having a flap angle changeable along the horizontal line;
   an actuator configured to provide an output to control the flap angle of the flap; and
   a transmission mechanism configured to transmit the output of the actuator to the flap,
   wherein the rotation shaft comprises a hollow shaft; and
   the transmission mechanism is accommodated inside the hollow shaft.

2. The lawn mower according to claim 1, wherein the transmission mechanism comprises:
   a control shaft fitted in the hollow shaft in a manner that the control shaft is slidable in an axial direction; and
   a conversion mechanism accommodated inside the hollow shaft, the conversion mechanism capable of converting sliding movement of the control shaft into movement to change the flap angle of the flap,
   wherein a lower end of the control shaft is coupled to the flap through the conversion mechanism; and
   an output shaft of the actuator is combined with an upper end of the control shaft in a manner that the control shaft is driven to move in a sliding manner.

3. The lawn mower according to claim 2, wherein the conversion mechanism comprises:
   a pin extending radially outward from the lower end of the control shaft; and
   a cam including a cam surface which can contract the pin,
   wherein the cam is rotatably supported by the hollow shaft about a swing center of the flap, and provided for the flap; and
   the cam surface comprises a cam groove capable of converting sliding movement of the pin which is displaced vertically together with the control shaft in a sliding manner into rotation movement of the cam.

4. The lawn mower according to claim 3, wherein the cam groove is formed around the swing center of the flap, and has a V-shape oriented substantially in a lateral direction.

5. The lawn mower according to claim 2, wherein the actuator comprises a linear actuator including the output shaft slidable in the axial direction of the control shaft; and
   a roller bearing is interposed between the output shaft and the control shaft.

6. The lawn mower according to claim 1, further comprising a lower cutter blade positioned below the cutter blade, wherein the lower cutter blade comprises a fixed blade fixed to the hollow shaft.

* * * * *